United States Patent [19]

Burns et al.

[11] Patent Number: 4,906,710

[45] Date of Patent: Mar. 6, 1990

[54] PRECERAMIC METALLOPOLYSILANES

[75] Inventors: Gary T. Burns; Gregg A. Zank, both of Midland, Mich.

[73] Assignee: Dow Corning Corporation, Midland, Mich.

[21] Appl. No.: 264,561

[22] Filed: Oct. 31, 1988

[51] Int. Cl.$^4$ .............................................. C08F 283/00
[52] U.S. Cl. ..................................... 525/474; 522/148; 522/172; 525/475; 528/10
[58] Field of Search ................... 528/10; 525/475, 474; 522/148, 172

[56] References Cited

U.S. PATENT DOCUMENTS

| | | | |
|---|---|---|---|
| 4,260,780 | 4/1981 | West et al. | 556/430 |
| 4,298,559 | 11/1981 | Baney et al. | 264/65 |
| 4,310,482 | 1/1982 | Baney et al. | 264/65 |
| 4,310,651 | 1/1982 | Baney et al. | 528/21 |
| 4,314,956 | 2/1982 | Baney et al. | 264/65 |
| 4,762,895 | 8/1988 | Chandra | 525/474 |

OTHER PUBLICATIONS

West, et al., 25 Poly. Preprints 4 (1984).
Kool, et al., 320 J. Organometallic Chem. 37 (1987).

*Primary Examiner*—Melvyn I. Marquis
*Attorney, Agent, or Firm*—James E. Bittell

[57] ABSTRACT

A process for the preparation of preceramic metallopolysilanes is described. The process consists of reacting polysilanes with metallic compounds from which can be generated open coordination sites associated with the metallic element. Such open coordination sites can be generated by the reduction of the metallic compound with an alkali metal reducing agent, or by heating a metallic compound which has thermally labile ligands, or by the UV irradiation of a carbonyl-containing metallic compound. The metals which can be incorporated into the polysilane include aluminum, boron, chromium, molybdenum, tungsten, titanium, zirconium, hafnium, vanadium, niobium, and tantalum. These metallopolysilanes are useful, when fired at high temperatures, to form metal-containing ceramic materials.

21 Claims, No Drawings

PRECERAMIC METALLOPOLYSILANES

BACKGROUND OF INVENTION

This invention relates to the preparation of metallopolysilanes. More specifically, this invention relates to the preparation of metallopolysilanes which contain significant amounts of aluminum, boron, chromium, molybdenum, tungsten, titanium, zirconium, hafnium, vanadium, niobium, or tantalum. These polymers are useful as chemical intermediates to synthesize other metal-containing organosilicon materials or polymers. These polymers can also be converted, when fired at high temperatures, to ceramic materials.

What is disclosed herein is a novel process to obtain metallopolysilanes by reacting polysilanes with certain metal-containing compounds or complexes. The metals are oxidatively added to the polysilane. Polysilanes with significantly higher metallic levels, relative to other methods of incorporating the metal components, can be prepared by the processes of this invention.

Chandra et al. in U.S. Pat. No. 4,762,895 described a method of preparing metallopolysilanes by reacting organohalogendisilanes with metal-containing compounds (such as metal halides) in the presence of a redistribution catalyst in an inert, essentially anhydrous atmosphere and removing volatile byproducts. The metal components were incorporated into the polysilane during the actual formation of the polysilane. The highest level of metal incorporation reported was about five weight percent; generally, the reported metal content of the metal-containing polysilanes was less than about two weight percent.

In Japanese Kokai Tokyo Koho Nos. 58/213023 and 59/161430 titanium- or zirconium-containing preceramic polymers were prepared by reacting polysilanes with titanium alkoxides or zirconium alkoxides. Such materials are expected to contain [Ti-O] and [Zr-O] units.

What is newly discovered is that metallopolysilanes can be prepared by reacting polysilanes with certain metallic compounds under conditions where open or unoccupied coordination sites can be generated.

THE INVENTION

This invention relates to a method of preparing a metallopolysilane, which method comprises (A) contacting a polysilane with a metallic compound capable of generating open coordination sites where the metallic compound contains a metal selected from the group consisting of aluminum, boron, chromium, molybdenum, tungsten, titanium, zirconium, hafnium, vanadium, niobium, and tantalum and (B) forming open coordination sites of the metallic compound, in the presence of the polysilane, until a metallopolysilane is obtained.

This invention also relates to a method for preparing a ceramic material which method consists of heating a metallopolysilane in an inert atmosphere or in a vacuum to a temperature of at least 750° C. until the metallopolysilane is converted to a ceramic material, where the metallopolysilane is prepared by a method which comprises (A) contacting a polysilane with a metallic compound capable of generating open coordination sites where the metallic compound contains a metal selected from the group consisting of aluminum, boron, chromium, molybdenum, tungsten, titanium, zirconium, hafnium, vanadium, niobium, and tantalum and (B) forming open coordination sites of the metallic compound, in the presence of the polysilane, until a metallopolysilane is obtained.

This invention concerns the preparation of metallopolysilanes by reacting polysilanes with certain metallic compounds or complexes. The polysilanes useful in this invention are characterized by Si-Si bonds in the skeletal backbone. The polysilanes should be capable of being converted to a ceramic material by pyrolysis to elevated temperatures. Preferably the polysilane should be capable of being converted to a ceramic product in a 20% or more yield; more preferably the ceramic yield of the polysilane should be greater than about 40%. Such polysilanes are well known in the art. The polysilane may contain units of general structure [$R_3Si$], [$R_2Si$], and [RSi] where each R is independently selected from the group consisting of hydrogen, alkyl radicals containing 1 to 20 carbon atoms, phenyl radicals, vinyl radicals, and radicals of the formula $A_yX'_{(3-y)}Si(CH_2)_z$— where A is a hydrogen atom or an alkyl radical containing 1 to 4 carbon atoms, y is an integer equal to 0 to 3, X' is chlorine or bromine, and z is an integer greater than or equal to 1. Polysilanes useful in this invention may contain silane units such as [$Me_2Si$], [MeSi], [PhMeSi], [PhSi], [ViSi], [MeHSi], [MeViSi], [$Ph_2Si$], [$Me_3Si$], and the like. Mixtures of polysilanes may also be employed.

The polysilanes of this invention can be prepared by techniques well known in the art. The actual methods used to prepare the polysilanes are not critical. Suitable polysilanes may be prepared by the reaction of organohalosilanes with alkali metals as described in Noll, *Chemistry and Technology of Silicones*, 347–49 (translated 2d Ger. Ed., Academic Press, 1968). More specifically, suitable polysilanes may prepared by the sodium metal reduction of organo-substituted chlorosilanes as described by West in U.S. Pat. No. 4,260,780 and West et al. in 25 *Polym. Preprints* 4 (1984), both of which are incorporated by reference.

Preferred polysilanes can be described by the unit formula

[RSi][$R_2Si$]

where there are present 0 to 60 mole percent [$R_2Si$] units and 40 to 100 mole percent [RSi] units and where each R is independently selected from the group consisting of hydrogen, alkyl radicals containing 1 to 20 carbon atoms, phenyl radicals, vinyl radicals, and radicals of the formula $A_yX'_{(3-y)}Si(CH_2)_z$— where A is a hydrogen atom or an alkyl radical containing 1 to 4 carbon atoms, y is an integer equal to 0 to 3, X' is chlorine or bromine, and z is an integer greater than or equal to 1. Halogen-containing polysilanes of unit formula

[RSi][$R_2Si$], where there are present 0 to 60 mole percent [$R_2Si$] units and 40 to 100 mole percent [RSi] units and where the remaining bonds on silicon are attached to other silicon atoms and chlorine atoms or bromine atoms, can be prepared by the method of Baney et al., U.S. Pat. No. 4,310,651. These halogen-containing polysilanes are generally difficult to handle due to their high reactivity in air. Therefore, polysilanes where the halogen atoms are replaced with less reactive groups are preferred. Such less reactive groups include alkyl groups, phenyl groups, amine groups, hydrogen atoms, and $Me_3SiO$— groups. The halogen atoms may be replaced by more than one type of these groups. The halogen atoms may be replaced with alkyl or phenyl groups by reacting the halogen-containing polysilanes with alkyl or aryl Grignard reagents or alkyl or aryl lithium compounds as described in Baney et al., U.S. Pat. No. 4,298,559. The halogen atoms in the halogen-containing polysilane may also be replaced with amine groups by reacting the halogen-containing polysilane with a aminolysis reagent of general formula $NHR'_2$ where each $R'$ is independently selected from the group consisting of hydrogen, alkyl radicals containing 1 to 4 carbon atoms, and phenyl radicals as described in Baney et al., U.S. Pat. No. 4,314,956; the resulting amino-polysilane contains amino groups of the general formula $-NHR'$. The halogen atoms may also be replaced by hydrogen atoms by reacting the halogen-containing polysilane with lithium aluminum hydride as described in Baney, U.S. Pat. No. 4,310,482. The halogen atoms may also be replaced with $Me_3SiO-$ groups by reacting the halogen-containing polysilane with $Me_3SiOSiMe_3$ as described in Baney, U.S. Pat. No. 4,310,481. The just discussed U.S. Pat. Nos. 4,310,651; 4,298,559; 4,314,956; 4,310,482; and 4,310,481 are hereby incorporated by reference. These polysilanes are further discussed in Baney et al., 2 *Organometallics* 859 (1983). Still other polysilanes may be used in the practice of this invention.

The metallic compound must be capable of becoming coordinatively unsaturated; that is, the metallic compound must be capable of generating or forming open or unoccupied coordination sites. There are three general methods of generating such sites associated with the metal element in the metallic compound.

The first method is the alkali metal reduction of the metallic compound. Open coordination sites may be generated from reducible metal compounds by reaction with alkali metals. By the general term "alkali metal" we mean to include both Group IA alkali metals and Group IIA alkaline earth metals. Preferred alkali metals include lithium, sodium, potassium, and magnesium. This method is carried out by combining the polysilane, metallic compound, and the reducing agent at room temperature. If desired, higher or lower temperatures may be used. Suitable reducible metallic compounds are of the formula $Cp_2MX_2$ where M is titanium, zirconium, hafnium, vanadium, niobium, tantalum, chromium, molybdenum, or tungsten, X is halogen (preferable chlorine), and Cp is a cyclopentadienyl group. These cyclopentadienyl compounds are generally commercially available. The reduction of such complexes are discussed in Kool et al., 320 J. Organometallic Chem. 37 (1987) and Sikora et al., 24 *Inorganic Syntheses* 147 (J. Shreeve, ed., Wiley-Interscience, 1986).

The second method of generating open coordination sites is by heating a mixture of the polysilane and a metallic compound which contains thermally labile ligands to a temperature less than or equal to about 175° C. For polysilanes which contain amine groups, suitable metallic compounds with thermally labile ligands include organic aluminum compounds of formula $R''_3Al$ and organic boron compounds of formula $R''_3B$ where $R''$ is an alkyl radical containing 1 to 4 carbon atoms. Preferred organic aluminum and boron compounds are triethyl aluminum and triethyl boron.

Other suitable metallic compounds with thermally labile ligands include compounds of formula $(MeCN)_3M'(CO)_3$ where $M'$ is molybdenum or tungsten. Also suitable are alkene and alkyne metal carbonyl compounds where the metal is chromium, molybdenum, or tungsten. Examples of such compounds can be described by the general formula $QM''(CO)_4$ where Q is cycloheptatriene, cyclo-octa-1,5-diene, 2,2,1-bicyclohepta-2,5-diene, or similar thermally labile groups and $M''$ is chromium, molybdenum, or tungsten. These chromium, molybdenum, or tungsten compounds may be used with all polysilanes; amine groups, although they may be present, are not required.

The third method of generating open coordination sites is by exposure of a carbonyl-containing metallic compound, in the presence of the polysilane, to UV irradiation. The metallic compound must contain at least one carbonyl ligand which can be removed under the influence of UV irradiation. Metallic compounds which contain two or more carbonyl ligands are preferred. Examples of such suitable carbonyl-containing compounds include compounds of general formula $(C_6H_6)M''(CO)_3$ and compounds of general formula $M''(CO)_6$ where $M''$ is chromium, molybdenum, or tungsten. Such carbonyl-containing metallic compounds and their photolysis are described in Cotton & Wilkinson, *Advanced Inorganic Chemistry* 1049-79 (4th ed., Wiley-Interscience, 1980).

Metallopolysilanes containing two or more metals selected from the group consisting of aluminum, boron, chromium, molybdenum, tungsten, titanium, zirconium, hafnium, vanadium, niobium, and tantalum may be also prepared by the methods of this invention. Such mixed metallopolysilanes can be prepared by either the addition of the different metals at the same time or by sequential addition of the different metals.

The polysilanes and metallic compounds should be reacted in an inert, essentially anhydrous atmosphere. Such reaction conditions help prevent excessive oxygen incorporation into the resulting metallopolysilanes and the occurrence of possible side reactions. By "essentially anhydrous" we mean that reasonable efforts are made to exclude water from the system during the reaction; the absolute exclusion of water is not required. Generally, the inert atmosphere is argon or nitrogen.

Although not wishing to be limited by theory, it is thought that once an open or coordinatively unsaturated site is generated in the metallic compound, in the presence of a polysilane, the resulting metallic complex is oxidatively added across a Si-Si bond. In other words, the following reactions are thought to occur:

$$L_nM \rightarrow ML_{(n-1)}$$

and $$ML_{(n-1)} + Si-Si \longrightarrow \underset{\underset{L_{(n-1)}}{|}}{Si-M-Si}$$

where M represents the metal atom and L represents the ligands. The incorporation of aluminum and boron is thought to occur through a different mechanism by reaction of the metallic compound with the amino group:

$$Si-SiNHR' + R''_3Al \longrightarrow R''H + \underset{\underset{R'}{|}}{Si-SiNAlR''_2}.$$

This reaction may proceed further:

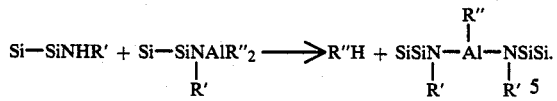

Similar reactions may occur for the boron-containing compounds. In any event, by the practice of this invention, a metallic-containing group is incorporated into the polysilane.

The metallopolysilanes prepared in this invention generally contain at least about 0.5 weight percent of the metal. It is generally preferred that the metal content of the metallopolysilane is between about 2 and 10 weight percent; more preferably the metal content is between 4 and 10 weight percent. But the metal content, if desired, can be as high as 20 to 25 weight percent.

The metallopolysilane of this invention may be pyrolyzed in an inert atmosphere, in a vacuum, or in an ammonia atmosphere at a temperature of at least 750° C. to give a ceramic material. Pyrolysis under an ammonia atmosphere should tend to form nitride-containing ceramic materials. Generally, pyrolysis under an inert atmosphere or vacuum is preferred. The polymers may be shaped first (such as an extruded fiber) and then fired to give a ceramic material. Or the polymers may be filled with ceramic type fillers and then fired to obtained filled ceramic materials. Additionally, pellets, composites, flakes, powders, and other articles may be prepared by pyrolysis of the metallopolysilanes of this invention. The ceramic materials produced by the pyrolysis of the metallopolysilanes of this invention generally contain between 2 and 30 weight percent of the metal. Preferably the ceramic materials contain about 5 to 10 weight percent of the metal. The metal in the ceramic can be in the form of a metal carbide and/or a metal silicide; other forms or phases of the metal may also be present. The presence of a metal carbide or silicide may influence the phase composition of the silicon carbide in the ceramic material. The presence of the metal in the ceramic material may increase the wear resistance of the ceramic material; the metal components may also allow for different electrical or magnetic properties in the ceramic materials.

So that those skilled in the art can better appreciate and understand the invention, the following examples are given. Unless otherwise indicated, all percentages are by weight. Throughout the specification "Me" represents a methyl group, "Ph" represents a phenyl group, "Vi" represents a vinyl group, and "Cp" represents a cyclopentadienyl group. In the following examples, the analytical methods used were as follows:

Carbon, hydrogen, and nitrogen were determined on a Control Equipment Corporation 240-XA Elemental Analyzer. Oxygen analysis was done on a Leco Oxygen Analyzer equipped with an Oxygen Determinator 316 (Model 783700) and an Electrode Furnace EF100. Silicon was determined by a fusion technique which consisted of converting the silicon material to soluble forms of silicon and analyzing the solute for total silicon by atomic absorption spectrometry. Metal analyses were carried out by fusing the polymers or ceramic materials with sodium peroxide in a closed nickel bomb and then dissolving the fusinate in an aqueous system. The metal was analyzed by either atomic adsorption spectrometry or inductively coupled plasma-atomic emission spectrometry.

Molecular weights were determined using gel permeation chromatography (GPC) with a Waters GPC equipped with a model 600E systems controller, a model 490 UV and model 410 Differential Diffractometer detectors; all values are relative to polystyrene. IR spectra were recorded on a Nicolet 5 DX spectrometer. Pyrolysis was carried out in an Astro graphite element tube furnace Model 1000-3060-FP12 equipped with an Eurotherm Controller/Programmer Model 822. Powder X-ray analyses were performed on a Norelco diffractometer interfaced with a HP 3354 computer. Oxidative stability of the ceramic material was evaluated by heating a powdered sample of the ceramic material to 1200° C. for 12 hours in air. Thermal stability of the ceramic material was evaluated by firing a powdered sample of the ceramic material to 1800° C. for 1 hour under argon.

EXAMPLE 1 POLYMER PREPARATION (A) PREPARATION OF A CHLORINE-CONTAINING METHYLPOLYSILANE

This polysilane was prepared using the general procedure of U.S. Pat. No. 4,310,651. A mixture of methylchlorodisilanes containing about 48% $(Cl_2MeSi)_2$, 40% $Cl_2MeSiSiMe_2Cl$, and 12% $(ClMe_2Si)_2$ was placed in a three-neck round bottom flask under an argon purge. The flask was equipped with a glass inlet tube, overhead stirrer, temperature programmer probe, and a distillation head. About 1.0% tetrabutylphosphonium chloride catalyst from Aldrich Chemical Co. was added. The reaction mixture was then heated to 250° C. at 2° C./min while byproducts were removed by distillation. The reaction temperature was held at 250° C. for about 45 minutes and then cooled to room temperature. A pale yellow polymer was obtained in about 15% yield based on the total weight of the reactants and stored under an inert atmosphere.

(B) PREPARATION OF A CHLORINE-CONTAINING PHENYLMETHYLPOLYSILANE

This polysilane was also prepared using the general procedure of U.S. Pat. No. 4,310,651. A mixture of methylchlorodisilanes (2083.8 g, containing about 48% $(Cl_2MeSi)_2$, 40% $Cl_2MeSiSiMe_2Cl$, and 12% $(ClMe_2Si)_2$) and phenyltrichlorosilane (91.0 g) was reacted as described in Example 1(A), yielding 295.0 g (13.6%) product. This polysilane contained 40.1% silicon, 29.9% carbon, 0.2% oxygen, and 6.0% hydrogen.

(C) PREPARATION OF A METHYL-CONTAINING METHYLPOLYSILANE

About 25.0 g of the chlorine-containing methylpolysilane of Example 1(A) (containing about 0.15 moles chlorine) was placed, under argon, in a three-neck flask equipped with a gas inlet tube, overhead stirrer, and a distillation head. The polymer was dissolved in about 200 mL toluene, cooled in an ice bath, and then alkylated with methyllithium (0.2 moles) in diethyl ether. The reaction mixture was warmed to room temperature and then heated to a distillation head temperature of about 100° C. while removing the volatile byproducts. The resulting slurry was cooled in an ice bath and any residual alkylating agent was neutralized with aqueous ammonium chloride. The toluene layer was dried with MgSO$_4$, filtered, and dried by stripping to 200° C. A white polymer (18.0 g) was obtained.

(D) PREPARATION OF A METHYL-CONTAINING PHENYLMETHYLPOLYSILANE

The chlorine-containing phenylmethylpolysilane of Example 1(B) (45.0 g, about 0.25 moles chlorine) was methylated with methyllithium (250 mL of 1.3M solution in diethyl ether) using a procedure similar to Example 1(C). A yellow, resinous solid (20.5 g) was obtained. GPC molecular weight: $M_n=963$, $M_w=1789$; the glass transition temperature was 100.4° C.

(E) PREPARATION OF A HYDROGEN-CONTAINING METHYLPOLYSILANE

LiAlH$_4$ (12.0 g) was placed in a one liter 3-neck flask (equipped with an overhead stirrer, septa, and argon inlet) under an argon atmosphere. Then 200 mL freshly distilled toluene and 60.0 g of the chlorine-containing polysilane of Example 1(A) in 250 mL toluene was added. The resulting slurry was stirred at room temperature for about 15 hours. The reaction mixture was cooled in an ice bath at which time any excess LiAlH$_4$ was destroyed by slowly adding 12 mL water, 12 mL of 15% aqueous NaOH, and then 36 mL water. The slurry was filtered and then stirred over Na$_2$SO$_4$ for about two hours. After a second filtration, toluene was removed by distillation. A hydrogen-containing methylpolysilane was obtained (25.7 g, 51.4%). The presence of SiH was confirmed by IR. GPC molecular weight: $M_n=1202$, $M_w=2544$. The polymer contained 47.0% silicon, 20.6% carbon, 2.3% oxygen, 7.4% chlorine, 0.20% nitrogen, and 6.3% hydrogen.

(F) PREPARATION OF A NH$_2$-CONTAINING PHENYLMETHYLPOLYSILANE

A chlorine-containing phenylmethylpolysilane similar to that described in Example 1(B) was dissolved in about 1500 mL toluene and cooled to −78° C. Anhydrous ammonia was rapidly bubbled through the solution for about two hours. The reaction mixture was warmed to room temperature and the excess ammonia was allowed to distill off. The solution was filtered and the filtrate concentrated under vacuum. The NH$_2$-containing phenylmethylpolysilane was obtained in 12.1% yield.

EXAMPLE 2

The methyl-containing methylpolysilane (10.0 g) of Example 1(C) was reacted with 5.0 g (0.02 moles) bis(-cyclopentadienyl)titanium dichloride and 2.2 g (0.09 moles) magnesium metal in 200 mL tetrahydrofuran for 20 hours at room temperature. The color of the slurry changed from red, to green, and finally to a dark red-brown. The solvent was removed at 100° C. under vacuum. The gummy solid was extracted with toluene until the toluene was colorless. The toluene extracts were combined and filtered. The toluene was removed at 150° C., leaving 12.0 g (83.9% yield) of the red-brown polymer containing 36.6% carbon, 7.0% hydrogen, 0.7% oxygen, 33.6% silicon, and 4.0% titanium. The glass transition temperature of the titanium-containing polymer was 140° C. A sample of this titanium-containing polysilane was converted to a ceramic material with a char yield of 69.3% by pyrolysis to 1200° C. at 5° C./min and holding at 1200° C. for two hours under an argon atmosphere. The resulting ceramic char contained 36.0% carbon, 44.7% silicon, 0.73% oxygen, and 7.3% titanium. The ceramic material had 97.1% mass retention and contained 24.0% oxygen when evaluated for oxidative stability. The ceramic material had 93.7% mass retention when tested for thermal stability. Quantitative X-ray analysis indicated about 2% alpha-SiC, 58% beta-SiC, and 10% TiC.

EXAMPLE 3

The methyl-containing methylpolysilane (5.0 g) of Example 1(C) and (MeCN)$_3$W(CO)$_3$ (1.0 g) were placed in a 250 mL flask under argon along with 100 mL tetrahydrofuran; the polysilane and a portion of the metal complex were soluble. The stirred slurry (pale yellow-green) was heated to 100° C. for 24 hours; a dark black slurry was obtained. After removal of the solvent under vacuum at 100° C., the residue was extracted with toluene until colorless. The combined extracts were filtered. After removal of the solvent at 150° C., a black polymer was obtained (4.8 g, 84.8% yield). The tungsten-containing polymer contained 29.0% carbon, 7.2% hydrogen, 4.1% oxygen, 50.6% silicon, and 4.7% tungsten. GPC molecular weight: $M_n=1277$, $M_w=3392$. An IR spectrum was recorded with CO-stretching frequencies observed at 1975 (s), 1940 (m), and 1890 (w) cm$^{-1}$. The glass transition temperature of the tungsten-containing polymer was 60° C. A sample of this tungsten-containing polysilane was converted to a ceramic material with a char yield of 66.7% by pyrolysis to 1200° C. at 5° C./min and holding at 1200° C. for two hours under an argon atmosphere. The resulting ceramic char contained 24.2% carbon, 47.9% silicon, 5.7% oxygen, and 7.1% tungsten. The ceramic material had 103.8% mass retention and contained 10.8% oxygen when evaluated for oxidative stability. The ceramic material had 86.7% mass retention when tested for thermal stability. Quantitative X-ray analysis indicated about 50% beta-SiC, 30% WSi$_2$, and 20% W$_5$Si$_2$.

EXAMPLE 4

The methyl-containing methylpolysilane (2.0 g) of Example 1(C) and (MeCN)$_3$W(CO)$_3$ (4.0 g) were reacted using the same procedure as Example 3. A toluene soluble black polymer (2.8 g, 60.3%) was obtained which contained 24.2% carbon, 5.3% hydrogen, 12.3% oxygen, 35.6% silicon, and 20.9% tungsten. An IR spectrum was recorded with CO-stretching frequencies observed at 1962 (s), 1933 (m), and 1868 (vs) cm$^{-1}$. A sample of this tungsten-containing polysilane was converted to a ceramic material with a char yield of 61.9% by pyrolysis to 1200° C. at 5° C./min and holding at 1200° C. for two hours under an argon atmosphere. The resulting ceramic char contained 18.8% carbon, 45.0% silicon, 4.7% oxygen, and 26.3% tungsten. The ceramic material had 94.5% mass retention and contained 17.7% oxygen when evaluated for oxidative stability. The ceramic material had 91.9% mass retention when tested for thermal stability. Qualitative X-ray analysis indicated the presence of alpha-SiC, beta-SiC, and WSi$_2$.

EXAMPLE 5

A 5.0 g sample of the methyl-containing methylpolysilane of Example 1(C) was treated with 1.0 g (MeCN)$_3$Mo(CO)$_3$ in the same manner as in Example 3.

A black polymer (5.0 g, 89.4%) was obtained which contained 29.1% carbon, 7.4% hydrogen, 3.1% oxygen, 51.5% silicon, and 4.1% molybdenum. An IR spectrum was recorded with CO-stretching frequencies observed at 2023 (m), 1883 (s), 1834 (s), and 1784 (m) cm$^{-1}$. The glass transition temperature of the molybdenum-containing polymer was 185° C. A sample of this molybdenum-containing polysilane was converted to a ceramic material with a char yield of 66.0% by pyrolysis to 1200° C. at 5° C./min and holding at 1200° C. for two hours under an argon atmosphere. The resulting ceramic char contained 24.8% carbon, 58.1% silicon, 5.1% oxygen, and 6.7% molybdenum. The ceramic material had 103.8% mass retention and contained 12.9% oxygen when evaluated for oxidative stability. The ceramic material had 86.9% mass retention when tested for thermal stability. Quantitative X-ray analysis indicated about 10% alpha-SiC, 62% beta-SiC, and 25% MoSi$_2$.

EXAMPLE 6

The methyl-containing phenylmethylpolysilane (7.0 g) of Example 1(D), molybdenum hexacarbonyl (3.0 g), and 250 mL toluene was placed in a 500 mL quartz Schlenk reactor equipped with a reflux condenser. The resulting clear solution was irradiated with a medium-pressure UV lamp for one hour. The irradiation intensity was sufficient to reflux the reaction mixture. The resulting red-black solution was stripped at 100° C. and the residue was extracted with toluene until colorless. The combined extracts were filtered. Upon removal of the solvent at 150° C., 7.7 g of a red-black polymer was obtained. The molybdenum-containing polymer contained 37.9% carbon, 7.6% hydrogen, 2.9% oxygen, 45.1% silicon, and 2.6% molybdenum. GPC molecular weight: $M_n=705$, $M_w=1083$. An IR spectrum was recorded with CO-stretching frequencies observed at 1967 (m), 1940 (s), and 1898 (m) cm$^{-1}$. The glass transition temperature of the molybdenum-containing polymer was 129.3° C. A sample of this molybdenum-containing polysilane was converted to a ceramic material with a char yield of 64.8% by pyrolysis to 1200° C. at 5° C./min and holding at 1200° C. for two hours under an argon atmosphere. The resulting ceramic char contained 31.6% carbon, 53.1% silicon, 5.3% oxygen, and 5.0% molybdenum. The ceramic material had 101.8% mass retention and contained 10.7% oxygen when evaluated for oxidative stability. The ceramic material had 86.2% mass retention when tested for thermal stability. Quantitative X-ray analysis indicated about 42% alpha-SiC and 55% beta-SiC.

EXAMPLE 7

A 7.0 g sample of the methyl-containing phenylmethylpolysilane of Example 1(D) and 3.0 g W(CO)$_6$ was treated with UV irradiation in the same manner as in Example 6. A red-black polymer (8.0 g) was obtained which contained 36.5% carbon, 7.2% hydrogen, 4.5% oxygen, 41.0% silicon, and 5.9% tungsten. An IR spectrum was recorded with CO-stretching frequencies observed at 1975 (s), 1925 (vs), and 1898 (s) cm$^{-1}$. The glass transition temperature of the tungsten-containing polymer was 164° C. A sample of this tungsten-containing polysilane was converted to a ceramic material with a char yield of 67.8% by pyrolysis to 1200° C. at 5° C./min and holding at 1200° C. for two hours under an argon atmosphere. The resulting ceramic char contained 24.8% carbon, 51.2% silicon, 6.2% oxygen, and 7.1% tungsten. The ceramic material had 102.9% mass retention and contained 13.9% oxygen when evaluated for oxidative stability. The ceramic material had 85.8% mass retention when tested for thermal stability. Quantitative X-ray analysis indicated about 26% alpha-SiC, 50% beta-SiC, and 20% of an unidentified phase.

EXAMPLE 8

The hydrogen-containing methylpolysilane (4.0 g) of Example 1(E) and 1.0 g (MeCN)$_3$W(CO)$_3$ were reacted using the same procedure as Example 3 except that the mixture was heated to 120° C. for 24 hours. A black polymer (4.7 g) was obtained which contained 20.7% carbon, 5.4% hydrogen, 2.3% oxygen, 44.2% silicon, and 5.5% tungsten. An IR spectrum was recorded with CO-stretching frequencies observed at 2066 (m), 1975 (m), 1933 (s), and 1898 (s) cm$^{-1}$. A sample of this tungsten-containing polysilane was converted to a ceramic material with a char yield of 81.7% by pyrolysis to 1200° C. at 5° C./min and holding at 1200° C. for two hours under an argon atmosphere. The resulting ceramic char contained 23.9% carbon, 57.4% silicon, 6.3% oxygen, and 7.9% tungsten. The ceramic material had 102.4% mass retention and contained 10.8% oxygen when evaluated for oxidative stability. The ceramic material had 87.5% mass retention when tested for thermal stability. Qualitative X-ray analysis indicated the presence of beta-SiC, W$_5$Si$_3$, and WSi$_2$.

EXAMPLE 9

The NH$_2$-containing phenylmethylpolysilane (19.3 g) of Example 1(F) was dissolved in 300 mL of degassed toluene; triethyl aluminum (10.2 g, 0.089 moles) was then added with stirring. The reaction mixture was refluxed for about two hours and then stirred at room temperature for 60 hours. After filtration and concentration of the filtrate under vacuum, 15.2 g of a toluene soluble polymer was obtained. This polymer contained 38.9% carbon, 8.6% hydrogen, and 30.1% silicon. A sample of this aluminum-containing polysilane was converted to a ceramic material with a char yield of 66.7% by pyrolysis to 1200° C. at 5° C./min and holding at 1200° C. for two hours under an argon atmosphere. The resulting ceramic char contained 30.7% carbon, 45.7% silicon, and 13.0% aluminum.

EXAMPLE 10

This example is included for comparative purposes only. A tungsten-containing polysilane was prepared from a mixture of methylchlorodisilanes, W(CO)$_6$, and tetrabutylphosphonium chloride using the procedure of U.S. Pat. No. 4,762,895. The resulting tungsten-containing polysilane was methylated using methyllithium. An IR spectra of the resulting polysilane exhibited CO-stretching frequencies at 1919 (vs) and 1869 (s) cm$^{-1}$. A comparison with the IR spectra of the tungsten-containing polysilane prepared by the method of the present invention in Example 7, where the CO-stretching frequencies were 1975 (s), 1925 (vs), and 1898 (s) cm$^{-1}$, shows that the metallopolysilanes of the present invention are different from the polysilanes of the prior art. The IR spectra of the tungsten-containing polysilane prepared by the method of the present invention in Examples 3, 4, and 7 also show the differences.

That which is claimed is:

1. A method of preparing a metallopolysilane, which method comprises (A) contacting a polysilane with a metallic compound capable of generating open coordination sites where the metallic compound contains a metal selected from the group consisting of aluminum, boron, chromium, molybdenum, tungsten, titanium, zirconium, hafnium, vanadium, niobium, and tantalum and (B) forming open coordination sites of the metallic compound, in the presence of the polysilane, until a metallopolysilane is obtained.

2. A method as defined in claim 1 wherein the metallopolysilane contains greater than 0.5 weight percent of the metal.

3. A method as defined in claim 2 wherein the metallopolysilane contains 2 to 10 weight percent of the metal.

4. A method as defined in claim 3 wherein the metallopolysilane contains 4 to 10 weight percent of the metal.

5. A method as defined in claim 1 wherein the open coordination sites are generated by reacting the metallic compound with an alkali metal reducing agent where the metallic compound is reducible.

6. A method as defined in claim 5 wherein the polysilane is described by the unit formula

[RSi][R$_2$Si]

where there are present 0 to 60 mole percent [R$_2$Si] units and 40 to 100 mole percent [RSi] units and where each R is independently selected from the group consisting of hydrogen, alkyl radicals containing 1 to 20 carbon atoms, phenyl radicals, vinyl radicals, and radicals of the formula A$_y$X'$_{(3-y)}$Si(CH$_2$)$_z$— where A is a hydrogen atom or an alkyl radical containing 1 to 4 carbon atoms, y is an integer equal to 0 to 3, X' is chlorine or bromine, and z is an integer greater than or equal to 1.

7. A method as defined in claim 5 wherein metallic compound is described by the formula Cp$_2$MX$_2$ where M is titanium, zirconium, hafnium, vanadium, niobium, tantalum, chromium, molybdenum, or tungsten and X is a halogen.

8. A method as defined in claim 7 wherein X is chlorine.

9. A method as defined in claim 1 wherein the open coordination sites are generated by heating the metallic compound to a temperature less than or equal to about 175° C. where the metallic compound contains thermally labile ligands.

10. A method as defined in claim 9 wherein the polysilane is described by the unit formula

[RSi][R$_2$Si]

where there are present 0 to 60 mole percent [R$_2$Si] units and 40 to 100 mole percent [RSi] units and where each R is independently selected from the group consisting of hydrogen, alkyl radicals containing 1 to 20 carbon atoms, phenyl radicals, vinyl radicals, and radicals of the formula A$_y$X'$_{(3-y)}$Si(CH$_2$)$_z$— where A is a hydrogen atom or an alkyl radical containing 1 to 4 carbon atoms, y is an integer equal to 0 to 3, X' is chlorine or bromine, and z is an integer greater than or equal to 1.

11. A method as defined in claim 9 wherein the polysilane contains amine groups and wherein the metallic compound is described by the formula R"$_3$Al or R"$_3$B where R" is an alkyl group containing 1 to 4 carbon atoms.

12. A method as defined in claim 11 wherein R" is an ethyl group.

13. A method as defined in claim 9 wherein the metallic compound is described by the formula (MeCN)$_3$M'(CO)$_3$ where M' is molybdenum or tungsten.

14. A method as defined in claim 9 wherein the metallic compound is described by the formula QM"(CO)$_4$ where Q is selected from the group consisting of cycloheptatriene, cyclo-octa-1,5-diene, and 2,2,1-bicyclohepta-2,5-diene and where M" is chromium, molybdenum, or tungsten.

15. A method as defined in claim 1 wherein the open coordination sites are generated by exposing the metallic compound to UV irradiation where the metallic compound contains at least one carbonyl ligand.

16. A method as defined in claim 15 wherein the polysilane is described by the unit formula

[RSi][R$_2$Si]

where there are present 0 to 60 mole percent [R$_2$Si] units and 40 to 100 mole percent [RSi] units and where each R is independently selected from the group consisting of hydrogen, alkyl radicals containing 1 to 20 carbon atoms, phenyl radicals, vinyl radicals, and radicals of the formula A$_y$X'$_{(3-y)}$Si(CH$_2$)$_z$— where A is a hydrogen atom or an alkyl radical containing 1 to 4 carbon atoms, y is an integer equal to 0 to 3, X' is chlorine or bromine, and z is an integer greater than or equal to 1.

17. A method as defined in claim 15 wherein the metallic compound contains two or more carbonyl ligands.

18. A method as defined in claim 17 wherein the metallic compound is described by the formula M"(CO)$_6$ where M" is chromium, molybdenum, or tungsten.

19. A metallopolysilane as prepared by method described in claim 5.

20. A metallopolysilane as prepared by the method described in claim 9.

21. A metallopolysilane as prepared by the method described in claim 15.

* * * * *